US012770337B2

(12) United States Patent
Kumar et al.

(10) Patent No.: US 12,770,337 B2
(45) Date of Patent: Oct. 20, 2026

(54) METAVERSE ENVIRONMENT READER AND NAVIGATION ASSISTANT

(71) Applicant: SAP SE, Walldorf (DE)

(72) Inventors: Abhinav Kumar, Bengaluru (IN); Vikas Rohatgi, Bengaluru (IN)

(73) Assignee: SAP SE, Walldorf (DE)

( * ) Notice: Subject to any disclaimer, the term of this patent is extended or adjusted under 35 U.S.C. 154(b) by 269 days.

(21) Appl. No.: 18/534,494

(22) Filed: Dec. 8, 2023

(65) Prior Publication Data

US 2025/0191303 A1 Jun. 12, 2025

(51) Int. Cl.
*G06T 19/00* (2011.01)
*G06T 13/40* (2011.01)

(52) U.S. Cl.
CPC ............ *G06T 19/003* (2013.01); *G06T 13/40* (2013.01)

(58) Field of Classification Search
None
See application file for complete search history.

(56) References Cited

U.S. PATENT DOCUMENTS

| | | | | |
|---|---|---|---|---|
| 12,154,139 | B2 * | 11/2024 | Canney | A63F 13/61 |
| 2021/0383115 | A1 * | 12/2021 | Alon | A63F 13/77 |
| 2023/0410159 | A1 * | 12/2023 | Zavesky | G06Q 30/0201 |
| 2024/0177196 | A1 * | 5/2024 | Canney | A63F 13/792 |
| 2024/0212265 | A1 * | 6/2024 | Agarwal | G10L 15/1815 |
| 2024/0295919 | A1 * | 9/2024 | Ummer | G06T 7/70 |
| 2025/0054231 | A1 * | 2/2025 | Chen | G06F 3/011 |
| 2025/0061635 | A1 * | 2/2025 | Dave | G09B 21/00 |
| 2025/0157113 | A1 * | 5/2025 | Braganza | G06Q 30/015 |

* cited by examiner

*Primary Examiner* — Hilina K Demeter
(74) *Attorney, Agent, or Firm* — Mintz Levin Cohn Ferris Glovsky and Popeo, P.C.

(57) ABSTRACT

A metaverse environment reader performs semantic segmentation and object detection steps to identify a plurality of objects in a metaverse scene. Next, the reader determines an order of importance of the plurality of objects in the scene based at least on a location and a size of each object. Then, the reader sorts the plurality of objects of the scene based on the determined order of importance. Next, the reader indexes the objects based on the segmenting of the scene and based on the determined order of importance. Then, the reader creates a description of the scene based on the indexing, where the description is an audio, haptic, or braille representation of the scene. Next, the reader generates and conveys one or more electrical signals which include an encoding of the description of the scene to a user device to be presented on a user interface.

18 Claims, 13 Drawing Sheets

300

400

500

METAVERSE ENVIRONMENT READER AND NAVIGATION ASSISTANT

TECHNICAL FIELD

The present disclosure generally relates to making the metaverse and other virtual environments more accessible to visually-impaired users and to visually-impaired and hearing-impaired users.

BACKGROUND

The metaverse refers to a virtual universe or digital realm where people can interact with each other and their surroundings in a shared online space. The metaverse is often described as an immersive and interconnected virtual reality space. The metaverse is envisioned as a comprehensive and persistent virtual environment that can be accessed from different devices and platforms. It is not limited to a single virtual world but encompasses multiple interconnected virtual worlds, virtual reality experiences. In the metaverse, users can explore virtual environments, interact with objects, engage in activities. The metaverse aims to provide a sense of presence and immersion, allowing users to feel as if they are physically present in the virtual space. It may incorporate technologies such as virtual reality (VR), augmented reality (AR), mixed reality (MR), haptic technology, and advanced graphics rendering to enhance the sensory experience.

SUMMARY

In some implementations, a metaverse environment reader receives a first scene of a metaverse. The metaverse environment reader performs semantic segmentation and object detection steps to identify a plurality of objects in the first scene. Next, the metaverse environment reader indexes the plurality of objects based on the semantic segmentation and object detection steps. In an example, indexing the plurality of objects based on the segmenting of the first scene involves determining an order of importance of the plurality of objects in the first scene based at least on a location and a size of each object of the plurality of objects, and then sorting the plurality of objects of the first scene based on the determined order of importance. Then, the metaverse environment reader creates a description of the first scene based on the indexing of the first scene, where the description is an audio, haptic, or braille representation of the first scene. Next, the metaverse environment reader generates one or more electrical signals which include an encoding of the description of the first scene. Then, the metaverse environment reader conveys the one or more electrical signals encoded with the description of the first scene to a user device to be presented on a user interface.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
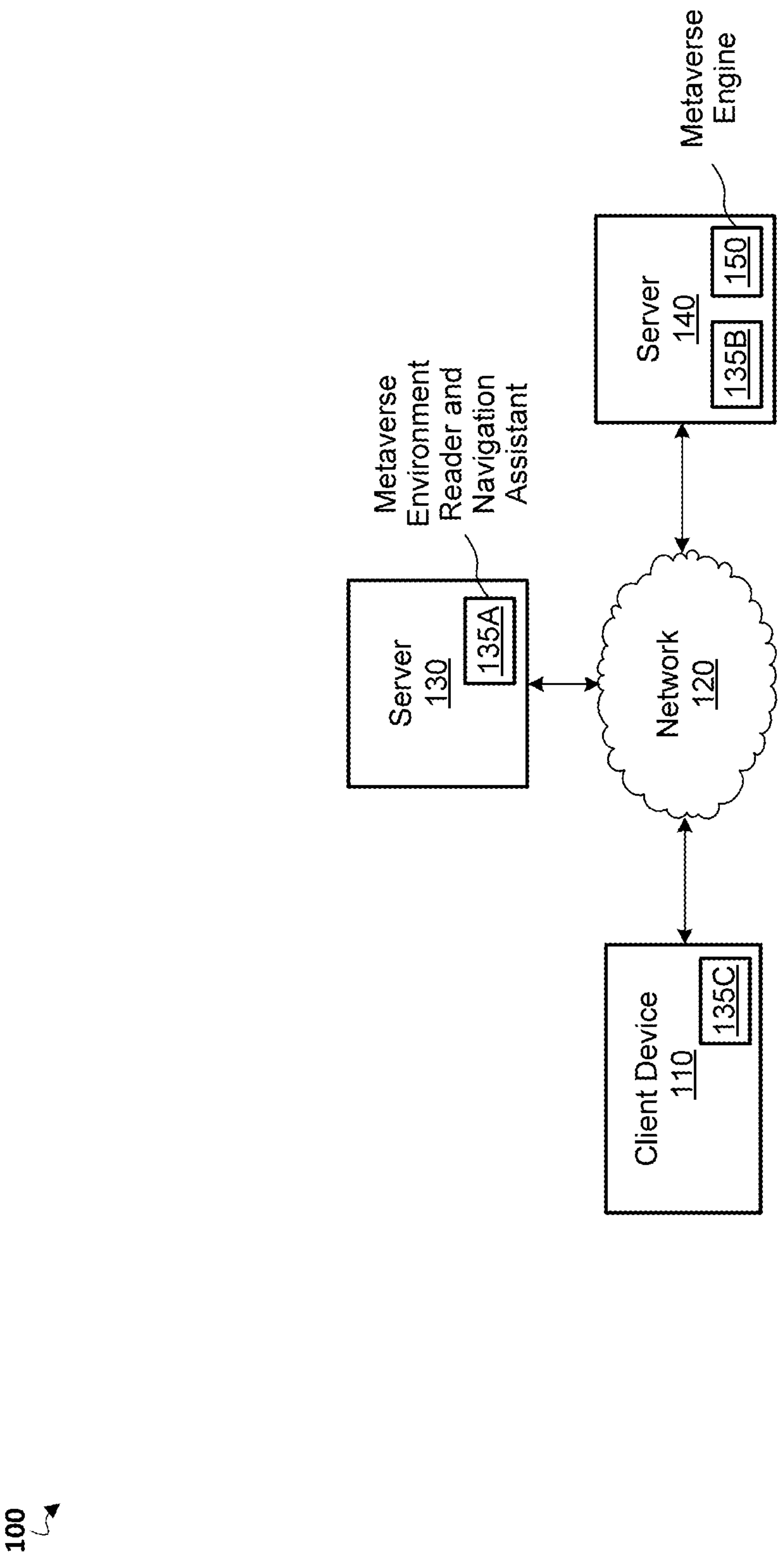
FIG. 1 illustrates an example of a system, in accordance with some example implementations of the current subject matter.

The metaverse is a hypothetical iteration of the Internet as a single, universal, and immersive virtual world. Users typically connect to the metaverse via virtual reality (VR) or augmented reality (AR) headsets. The metaverse can also refer to a network of three-dimensional (3D) virtual worlds that focus on social and economic connections. Components of metaverse technology have been deployed within online video games. Deployments of the metaverse often involve generating a persistence 3D world with the user represented as an avatar. It is noted that the "metaverse" may also be referred to more generally as a "virtual environment". Also, the descriptions of techniques for enhancing and making the metaverse experience more accessible may also be implemented to enhance and make video games, online games, and/or other types of video and/or audio content more accessible.

The current state of inaccessible metaverse platforms and experiences is significantly excluding and leaving behind individuals who are blind and individuals who are blind and deaf. The lack of accessibility in the metaverse is impacting these specific populations in multiple ways. A first impact relates to the visual exclusion of individuals from the metaverse. The visual nature of the metaverse creates a significant barrier for individuals who are blind or blind and deaf. Inaccessible interfaces prevent such individuals from accessing and navigating virtual environments. Without the accessibility support, these individuals are unable to fully engage with the metaverse and participate in virtual activities.

A second impact relates to the navigational difficulties for blind individuals or blind and deaf individuals. This is caused by inaccessible navigation interfaces. For example, the lack of haptic cues poses challenges for individuals who are blind or blind and deaf. These individuals rely on assistive technologies and accessible navigation features to explore virtual environments, move within the metaverse, and interact with virtual objects. Without these accessibility features, their ability to navigate and engage with the metaverse is severely limited. The inaccessibility of the metaverse denies individuals who are blind or blind and deaf the opportunity to fully participate within virtual environments. Accordingly, solutions to the above problems are presented herein.

Before addressing the solutions to the above problems, a general description of the metaverse will be presented. The metaverse consists of various scenes and objects that users can encounter and interact with. A metaverse scene typically represents a virtual environment, such as a living room, a park, a city street, a train station, a shopping mall, and so on. These scenes are often highly detailed and immersive, designed to provide a rich and engaging experience to users. Metaverse objects are the digital entities that populate these virtual environments. The metaverse objects can be anything from simple geometric shapes to complex 3D models like a television, coffee table, and a couch in a living room. These objects have various properties and behaviors, allowing users to interact with them in different ways. For example, people (avatars) can walk around the living room, the television can be turned on or off, and so on.

In addition to static objects, the metaverse can also include dynamic interactive objects such as moving vehicles (e.g., train, car) which have the ability to move. Dynamic or interactive objects may have programmed behaviors, enabling them to react to user actions. Overall, the metaverse scenes encompass the virtual environments users explore, while metaverse objects are the digital entities that populate these environments. Together, they form the building blocks of the metaverse, providing a metaverse platform for immersive experiences, social interactions, and creative expression.

Referring now to FIG. 1, a block diagram illustrating an example of a computing system 100 is depicted, in accordance with some example embodiments. In FIG. 1, the system 100 may include at least one or more client devices 110, a network 120, one or more servers 130, and one or more servers 140. Server 130 is shown as including metaverse environment reader and navigation assistant 135A. In an example, at least a portion of the functionality of metaverse environment reader and navigation assistant 135A resides in sub-component 135B of server 140 and/or at least a portion of the functionality of metaverse environment reader and navigation assistant 135A resides in sub-component 135C of client device 110. In other words, in some examples, the overall functionality of metaverse environment reader and navigation assistant 135 can be split up into specific functions that are performed in multiple locations.

The one or more client devices 110, the one or more servers 130, and the one or more servers 140 may be communicatively coupled via a network 120. The one or more client devices 110 may include processor-based devices including, for example, a mobile device, a wearable apparatus, a virtual reality (VR) or augmented reality (AR) headset, a personal computer, a workstation, an Internet-of-Things (IoT) appliance, and/or the like. The network 120 may be a wired network and/or wireless network including, for example, a public land mobile network (PLMN), a local area network (LAN), a virtual local area network (VLAN), a wide area network (WAN), the Internet, and/or the like.

The one or more servers 130 and 140 may include any number of processing devices, memory devices, and/or the like for executing software applications. Server 130 and/or server 140 may be part of a private computing platform or part of a public cloud platform, depending on the implementation. The cloud platform may include resources, such as at least one computer (e.g., a server), data storage, and a network (including network equipment) that couples the computer(s) and storage. The cloud platform may also include other resources, such as operating systems, hypervisors, and/or other resources, to virtualize physical resources (e.g., via virtual machines) and provide deployment (e.g., via containers) of applications (which provide services, for example, on the cloud platform, and other resources). In the case of a "public" cloud platform, the services may be provided on-demand to a client, or tenant, via the Internet. For example, the resources at the public cloud platform may be operated and/or owned by a cloud service provider (e.g., Amazon Web Services, Azure), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

Server 140 includes metaverse engine 150 for generating a metaverse including various immersive scenes for one or more users of client device 110 to interact with. Metaverse engine 150 may also be referred to as metaverse platform 150. Server 130 includes metaverse environment reader and navigation assistant 135A which reads and analyzes the metaverse generated by metaverse engine 150. Based on the reading and analysis, metaverse environment reader and navigation assistant 135A generates an accessible version of the metaverse for one or more users of client device 110. The accessible version of the metaverse is intended to enable visually-impaired (i.e., blind) users or visually-impaired and hearing-impaired (i.e., deaf) users to enjoy a more interactive experience of the metaverse than would be attainable from the original version of the metaverse generated by metaverse engine 150. It is noted that the terms "blind" and "visually-impaired" may be used interchangeably herein. Similarly, the terms "deaf" and "hearing-impaired" may be used interchangeably herein.

Figure 2:
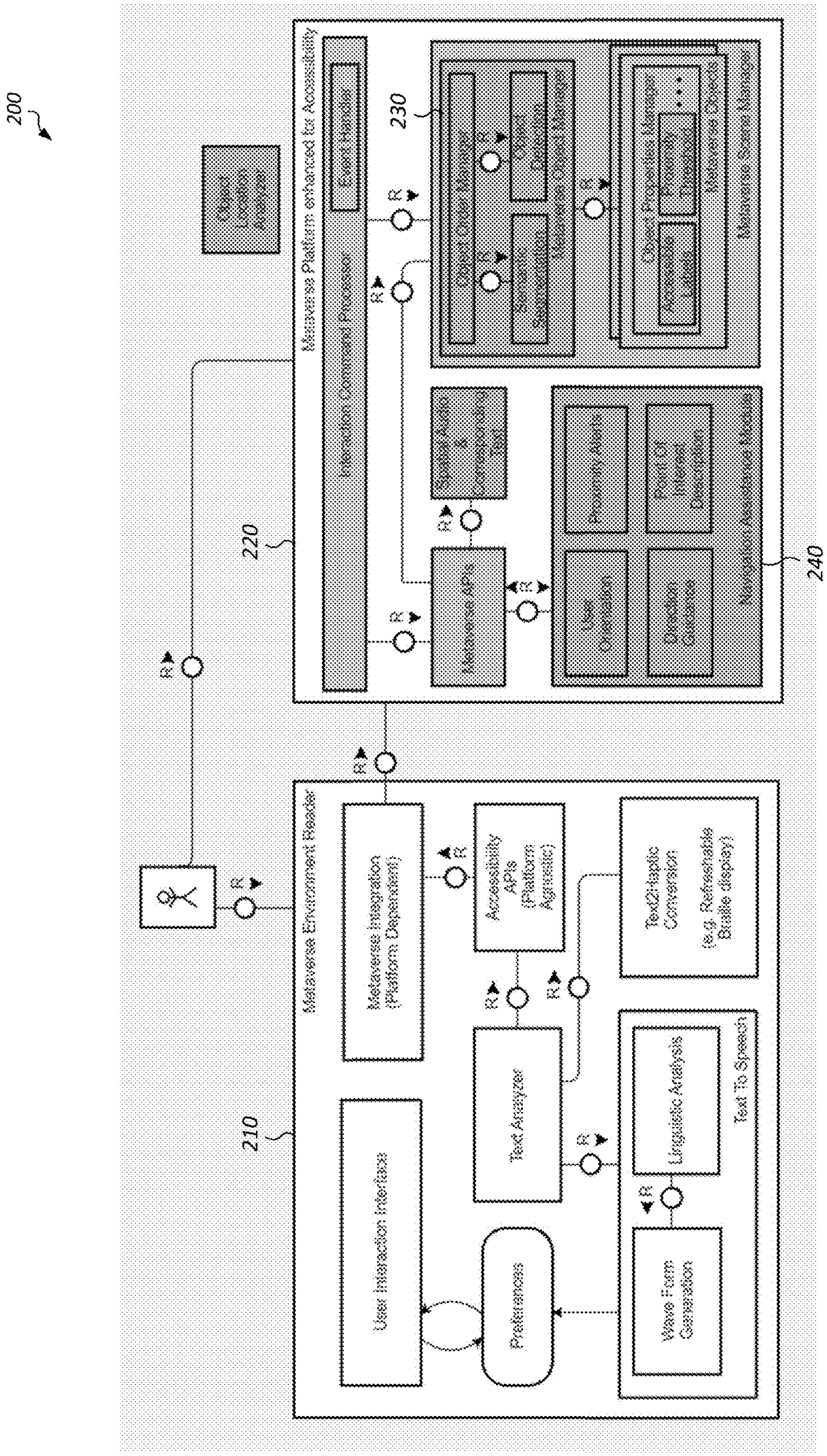
FIG. 2 illustrates a block diagram of components of an apparatus or a system, in accordance with some example implementations of the current subject matter.

Turning now to FIG. 2, a block diagram of components of an apparatus or a system 200 for implementing the techniques described herein is shown. System 200 illustrates the architecture of a first approach for enhancing a metaverse platform 220 to support accessibility and provide navigation assistance. In an example, the enhancements to metaverse platform 220 include, but are not limited to, new components such as object manager 230, navigation assistance module 240, a spatial audio and corresponding text module, accessible labels component, proximity threshold component, and object location analyzer. Existing components of metaverse platform 220 include, but are not limited to, metaverse APIs, an interaction command processor, and a metaverse scene manager. In the example depicted in FIG. 2, the virtual objects of a scene will have additional attributes providing text alternatives (i.e., labels) which will be used by the environment reader 210. For example, a virtual television may have a label describing it as "56-inch wall-mounted flat television". This label will be an additional property like other properties of metaverse objects (e.g., a property describing the color of the object).

Once all of the virtual objects of a scene are labelled, an object manager 230 generates an ordering of objects constituent in the scene. In this step, a description of the scene is generated by the object manager 230 in an accurate and coherent manner to provide an immersive and interconnected experience using the labels from various virtual objects. For example, when generating a description of a living room scene in the metaverse, if the generated description mentions the couch, the coffee table, and then the television, it creates a mental image where the couch and coffee table are positioned in front of the television. However, if the generated description reverses the order and mentions the television first, followed by the couch and then the coffee table, it conveys a different arrangement where the television is positioned in front of the couch.

Similarly, the ordering of objects can influence the user's attention and focus within the scene. If the generated description of a scene starts with the most prominent or central object, followed by the secondary objects, it helps guide the user's visual and mental exploration of the virtual environment. This can be particularly relevant when describing complex scenes with multiple objects or when emphasizing a specific feature or interaction. Furthermore, the ordering of objects can also affect the narrative or storytelling within the metaverse scene. By strategically arranging the objects and describing them in a specific sequence, object manager 230 can create a sense of progression or build-up in the user's experience. For example, describing a path leading to a grand castle gate, followed by a description of the castle's towering walls and finally the magnificent courtyard, sets the stage for a narrative journey through the scene.

In an example, the location of each object in a given scene is maintained by the developer of the scene. In this example, the order of objects is determined on the fly with respect to the avatar via mathematically calculating the distance of objects from the avatar based on their locations. In another example, object manager 230 determines the ordering of various objects in a given metaverse scene and generates a coherent and immersive description of the scene using the labels of the various metaverse objects in the scene. The ordering of various objects in metaverse can be determined in multiple ways such as: (1) the ordering of each object is manually maintained by the developer of the scene. In this example, the ordering is like maintaining a tab index order in graphical user interface (GUI) screens. Also, (2) one or more image processing tools may be used to identify the locations of various objects in the scene and then this information is used to determine the order of each object in the scene. In an example, the image processing may include a semantic segmentation step and an object detection step. The semantic segmentation step may involve segmenting a scene into various object regions, such as buildings, trees, vehicles, or the like. Segmenting the scene makes it possible to determine the size, location, and prominence of objects in the scene. Next, object manager 230 may determine the order of objects based on their size, location, or prominence in the scene. The prominence of an object may be determined based on the size and location of the object, such as if a first object is in the center of the scene, it will be considered more prominent than a second object on the periphery of the scene. Similarly, if a third object is larger than a fourth object, then the third object will be considered to be more prominent than the fourth object. Algorithms such as U-Net, Fully Convolutional Networks (FCN), Mask R-CNN (region-based convolutional neural network), or others may be used for the semantic segmentation step. The object detection step may use algorithms such as Faster R-CNN, YOLO (You Only Look Once), SSD (Single Shot MultiBox Detector), or others. These algorithms use deep learning techniques to detect objects by bounding boxes and provide their approximate positions.

Once the order of the objects is determined, object manager 230 may use various natural language processing (NLP) deep learning techniques like Recurrent Neural Networks (RNNs), Transformer models, Generative Pre-trained Transformer (GPT) models, or other models to generate an accurate and coherent description of the scene. Similarly, to help the user navigate across the metaverse, navigation assistance module 240 is part of metaverse platform 220. The navigation assistance module 240 includes a sub-module to obtain the user's (i.e., avatar's) current direction orientation using the metaverse application programming interfaces (APIs).

In the metaverse, proximity alerts, direction guidance, and point of interest descriptions work together to enhance the user's navigation, awareness, and understanding of the virtual environment. Proximity alerts notify users when they are near to certain objects within the metaverse scene. These alerts can be triggered based on predefined distances or spatial boundaries. For example, if a user approaches an important object or enters a specific area, a proximity alert may be generated to draw their attention. Direction guidance provides users with navigational assistance within the metaverse. Direction guidance helps users find their way to specific objects of interest. Direction guidance may be based on pre-defined paths, user-set waypoints, or a combination of both. Direction guidance helps users navigate complex scenes, follow specific routes, or locate points of interest within the metaverse. Point of interest (POI) descriptions provide users with detailed information and context about significant objects within the metaverse. When a user approaches a POI, a description or additional details about the object can be provided.

To enable these proximity alerts, direction guidance, and POI features, the objects within the metaverse scene may have additional properties or metadata assigned to them. For example, objects may be tagged with proximity thresholds and descriptive information that is used by the metaverse platform 220 to generate proximity alerts, direction guidance, and point of interest descriptions. By enhancing the objects with these properties, the metaverse platform 220 may intelligently detect user proximity, calculate navigation paths, and provide relevant information which is converted to the format which the user will understand to enhance the user experience.

With the various enhancements in the metaverse platform 220, the metaverse environment reader 210 will receive the textual cues for metaverse scenes, metaverse navigation, and various spatial audio outputs via a platform-dependent metaverse integration component. A text analyzer module of metaverse environment reader 210 is coupled to the metaverse integration component via accessibility APIs which are platform agnostic. The text analyzer module will analyze the text for composing utterance of words. After text analysis, a linguistic analysis process may be performed. In an example, the linguistic analysis process may have three steps. These three steps may include phasing of text (e.g., dividing a large word or phrase into phases), intonation (e.g., the fall and rise of the voice in speaking), and lastly duration for speaking. Additionally, various preferences may be applied to impart a particular accent or dialect for a given language (e.g., American English, British English) or for particular regions of a country. After the linguistic analysis process, the sound waves may be generated and provided to the user via a user interaction interface (e.g., headphones, speakers). Also, additional preferences that may be applied include volume selections for increasing or decreasing the volume of the audio output. For a blind and deaf user, the analyzed text may be converted into an output of a haptic device such as a refreshable braille display.

It is noted that metaverse environment reader 210 may be implemented using any suitable combination of program instructions, firmware, and/or circuitry. In an example, metaverse environment reader 210 is implemented by a processing device (e.g., central processing unit (CPU), graphics processing unit (GPU)) executing program instructions. In another example, metaverse environment reader 210 is implemented by a programmable logic device (e.g., field programmable gate array (FPGA)). In a further example, metaverse environment reader 210 is implemented by dedicated circuitry (e.g., application specific integrated circuit (ASIC)). In a still further example, metaverse environment reader 210 is implemented by any combination of the above mechanisms and/or with other types of circuitry and executable instructions. Metaverse environment reader 210 may be implemented as part of a server (e.g., server 130 of FIG. 1), as part of a cloud platform, as part of a computing device, or as a standalone component.

Figure 3:
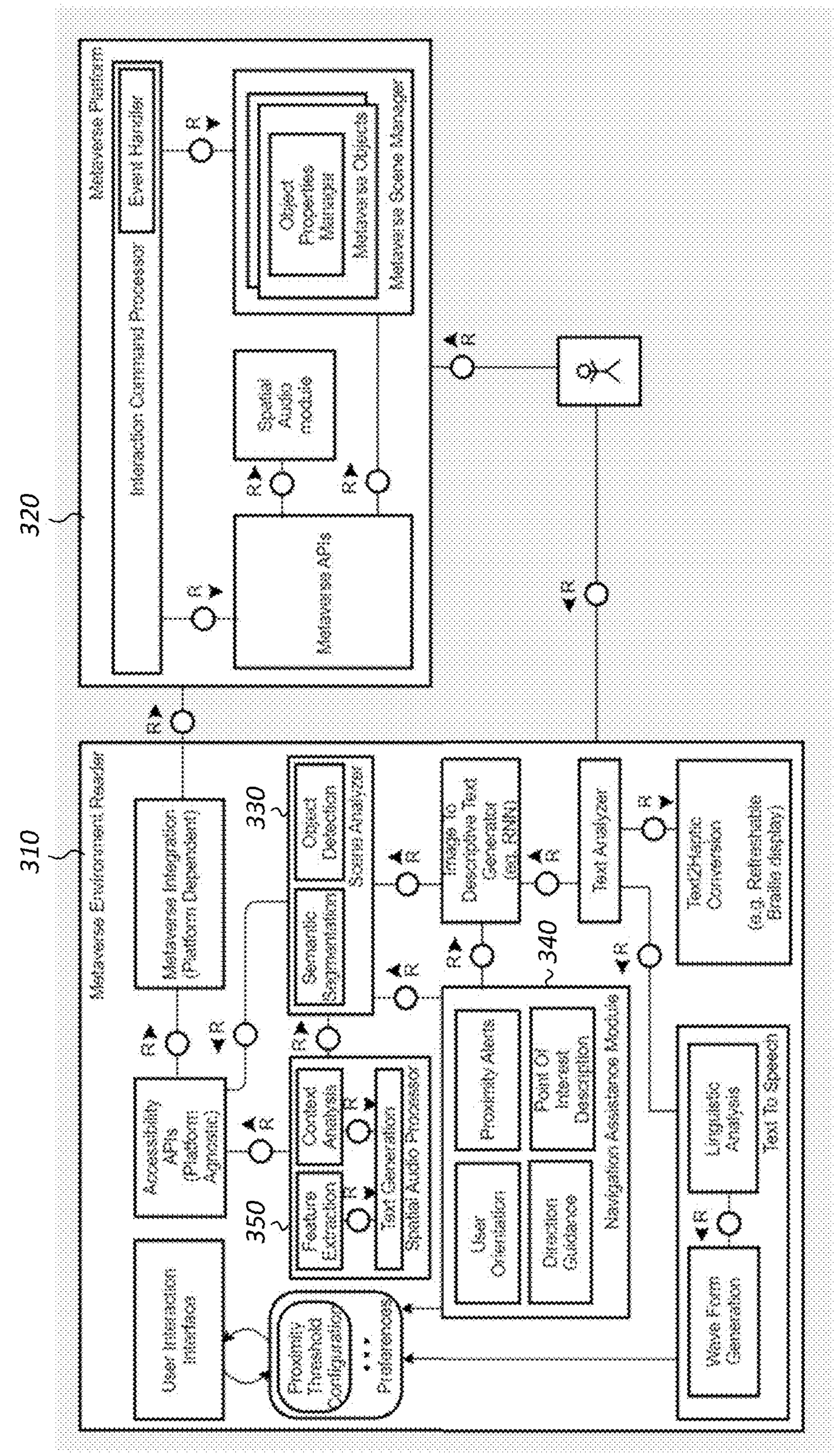
FIG. 3 illustrates a block diagram of components of an apparatus or a system, in accordance with some example implementations of the current subject matter.

Referring now to FIG. 3, a block diagram of components of an apparatus or a system 300 for implementing the techniques described herein is shown. The approach of system 300 differs from the approach of system 200 in that system 300 does not rely on any changes in the current metaverse platform(s) 320. In system 300, the responsibilities related to accessibility are part of the metaverse environment reader 310 employing various deep learning techniques. In system 300, the metaverse platform 320 will provide the spatial audio and scene (i.e., visual picture) to the metaverse environment reader 310 via APIs for conversion to text and/or haptic output for consumption by blind users or by blind and deaf users. In an example, the metaverse environment reader 310 includes a scene analysis module 330 to analyze the scene and a spatial audio processing module 350 for processing of the spatial audio generated by the metaverse platform 320.

The scene analysis module 330 may have sub-modules for semantic segmentation and object detection. The semantic segmentation sub-module may segment a scene into various object regions, such as buildings, trees, vehicles, and so on. The semantic segmentation sub-module may determine the order of objects based on their size, location, or prominence in the scene. The semantic segmentation sub-module may use algorithms such as U-Net, FCN (Fully Convolutional Networks), and Mask R-CNN. The object detection sub-module may use algorithms such as Faster R-CNN, YOLO (You Only Look Once), or SSD (Single Shot MultiBox Detector), and the like. These algorithms use deep learning techniques to detect objects by bounding boxes and provide their approximate positions.

After the scene analysis process is performed, various NLP deep learning techniques like Recurrent Neural Networks (RNNs), Transformer models, or GPT (Generative Pre-trained Transformer) models may be used to generate an accurate and coherent description of the scene. Similarly, the spatial audio processing module 350 may have a sub-module for extracting features from the spatial sound and another sub-module to analyze these extracted features in the context of the current metaverse scene. Once the features have been extracted from the spatial sound and analyzed, a text generation module will generate text which is presented to the user in a format which the user will be able to understand.

In an example, the extraction of various features from the spatial audio signal is a multi-step process. These steps may include the following: (1) Pre-process the spatial audio signal for removing noise and normalizing the volume. Various algorithms like spectral subtraction, Wiener filtering, or adaptive filtering may be used for noise reduction. Peak normalization or dynamic range compression algorithms may be used for volume normalization. (2) Algorithms like Short-Time Fourier Transform (STFT) and Mel-frequency cepstral coefficients (MFCCs) may be used to extract features. These extracted features may be used against a pre-trained classifications model or sound event detection algorithms (built using CNNs, Recurrent Neural Networks (RNNs), long short-term memory (LSTM), and/or Gaussian Mixture Model (GMM) algorithms) to recognize the object from the sound.

Once spatial audio processor module 350 has extracted the various features from the audio signal, the features may be analysed in the context of the metaverse virtual scene to provide a more accurate and informative text description. This step may consider factors like the location, time of day, or other environmental cues that could influence the interpretation of the sound. Once the spatial audio signal is processed and analysed in context of the metaverse scene, the corresponding text description may be generated using deep learning techniques like RNNs or LSTM or Transformer-based models (e.g., generative pre-trained transformer (GPT), bidirectional encoder representations from transformers (BERT)).

After the scene analysis and spatial audio processing steps, the text analyzer module will analyze the text description for composing an utterance of words. After text analysis is performed by the text analyzer module, a linguistic analysis process may be performed. The linguistic analysis process may have three steps. First, phasing of text (e.g., dividing a large word or phrase into phases), second, intonation (e.g., the rise and fall of the voice in speaking), and third, duration for speaking.

After the linguistic analysis process is complete, the sound waves may be generated. For a blind and deaf user, the analyzed text may be converted into an output of haptic device like a refreshable braille display. In addition to describing the scene and the spatial audio in text to users, the navigation assistance module 340 may work in tandem with scene analyzer module 330 to provide proximity alerts (based on configured proximity thresholds), direction guidance, and detailed point of interest description of any identified significant object.

Figure 4:
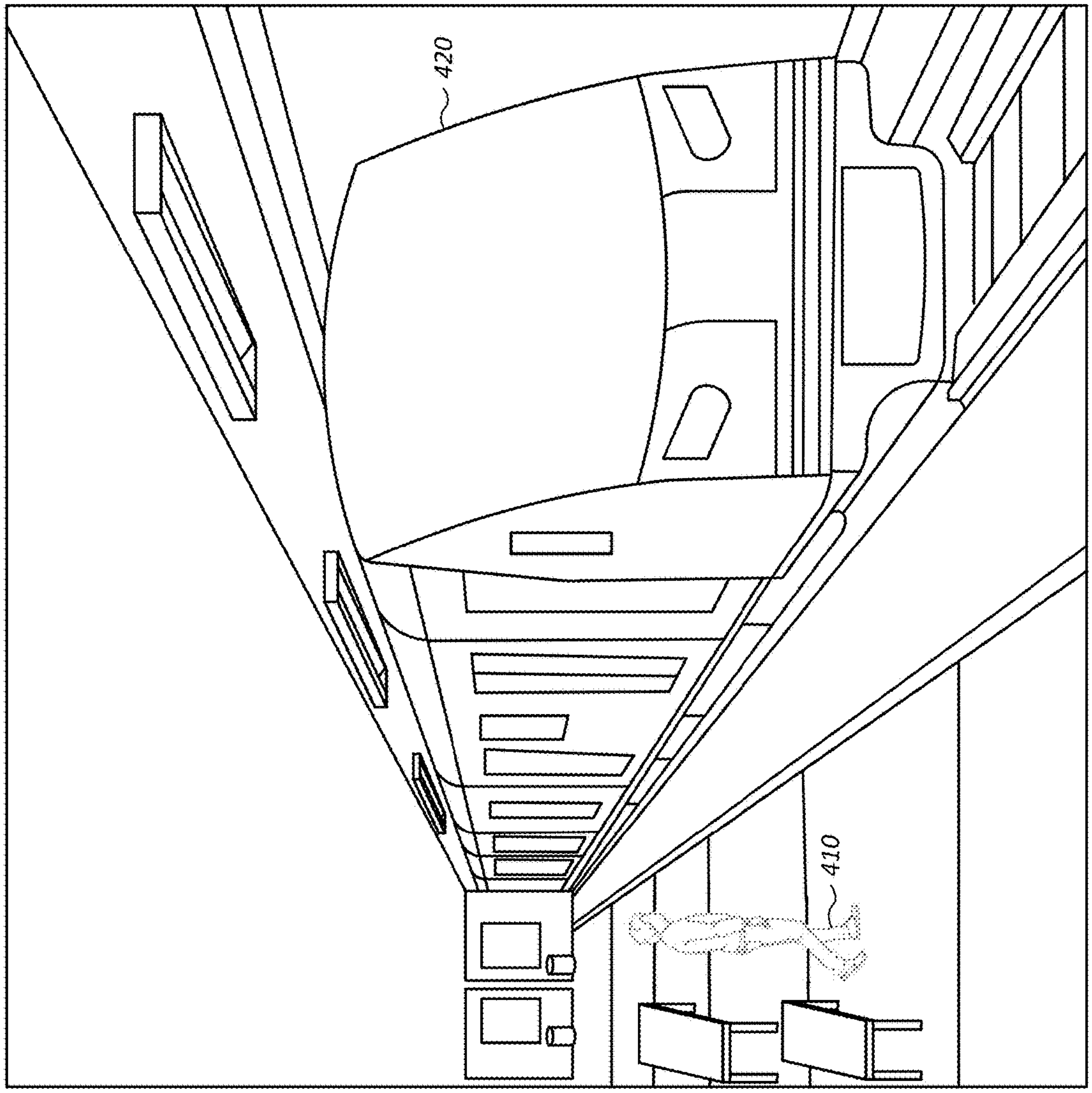
FIG. 4 illustrates an example of a scene of a metaverse, in accordance with some example implementations of the current subject matter.

Turning now to FIG. 4, a diagram illustrating an example of a scene 400 of a metaverse is shown. Scene 400 is an example of a scene that may be generated in a metaverse. As depicted, scene 400 shows an avatar 410 (representing a user) in a train station. The proximity alert generation mechanism previously described may be utilized by a navigation assistance module (e.g., navigation assistance module 340 of FIG. 3) to alert the user as the avatar 410 approaches the train 420. For example, the direction and orientation of the avatar 410 may be determined or received by the navigation assistance module of a metaverse environment reader (e.g., metaverse environment reader 310). Also, the location of the train 420 may be determined by the metaverse environment reader analyzing and segmenting scene 400. The train 420 may have a threshold distance associated with it, such that when the avatar 410 approaches the train 420 and the distance separating the two is less than the threshold distance, the navigation assistance module may generate a proximity alert.

Figure 5:
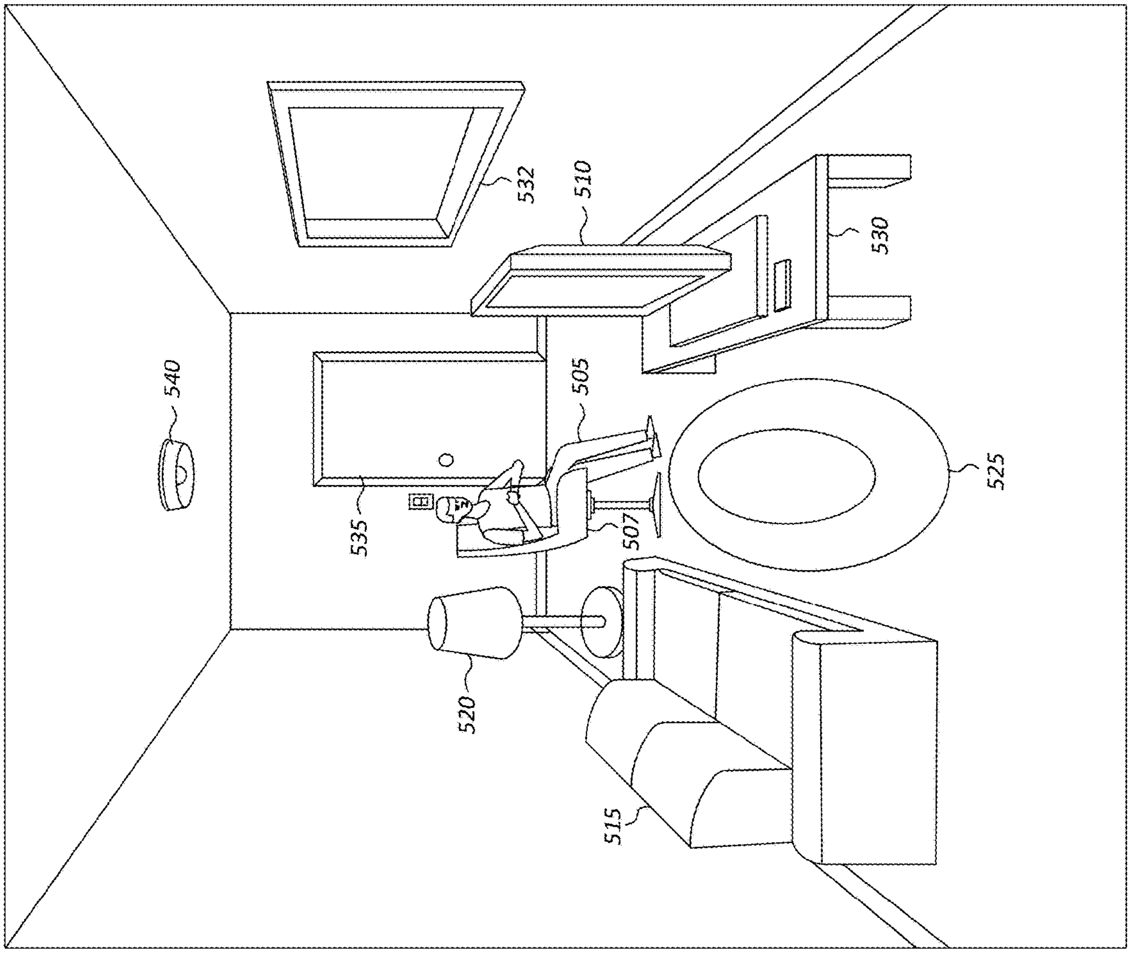
FIG. 5 illustrates another example of a scene of a metaverse, in accordance with some example implementations of the current subject matter.

Referring now to FIG. 5, a diagram illustrating another example of a scene 500 of a metaverse is shown. Scene 500 is another example of a scene that may be generated in a metaverse by a metaverse platform (e.g., metaverse platform 320 of FIG. 3). As shown, scene 500 depicts a living room with multiple objects including the user 505 (i.e., avatar 505) sitting in chair 507, television 510, couch 515, lamp 520, rug 525, television stand 530, window 532, door 535, and ceiling light 540. In an example, the metaverse environment reader analyzes and performs semantic segmentation on scene 500 to detect and identify these objects. When analyzing and segmenting scene 500, the metaverse environment reader may determine the order of importance of the objects in scene 500. In an example, the metaverse environment reader may include a trained deep learning engine which determines that television 510 is the most prominent object in scene 500, and thus, television 510 will be the first item described in the description that is generated and presented to the user. In another example, the trained deep learning engine may determine that couch 515 is the most prominent object in scene 500, and thus, couch 515 will be the first item mentioned in the description that is generated and presented to the user in the form of speech, text, Braille display, or the like.

The metaverse environment reader may utilize any number of deep learning engines to analyze scene 500. The first deep learning engine used by the metaverse environment reader may have been pre-trained with some number of images of different environments to be able to identify scene 500 as a living room. Then, after scene 500 has been classified as a living room, the metaverse environment reader may use a second deep learning engine that has been pre-trained specifically for a living room environment. The second deep learning engine may have been pre-trained with a large number of images of living rooms to enable the second deep learning engine to identify the objects that are typically present in a living room environment. In other examples, the metaverse environment reader may use more than two different types of deep learning engines depending on the type of metaverse scene being analyzed. Alternatively, two or more deep learning engines may be fused together into a single deep learning engine to perform multiple functions.

The metaverse environment reader may also include a navigation assistance module that tracks, based on data received from the user's headset, the location and orientation of user 505 in relation to the objects of scene 500. If the user 505 stands up from chair 507 and starts to move around the living room, then the navigation assistance module may generate proximity alerts as the distance between user 505 and the various objects falls below corresponding thresholds for these objects. Also, the description of the living room may change based on which direction user 505 is facing and based on which objects are prominent when viewed from the current orientation of user 505.

Figure 6:
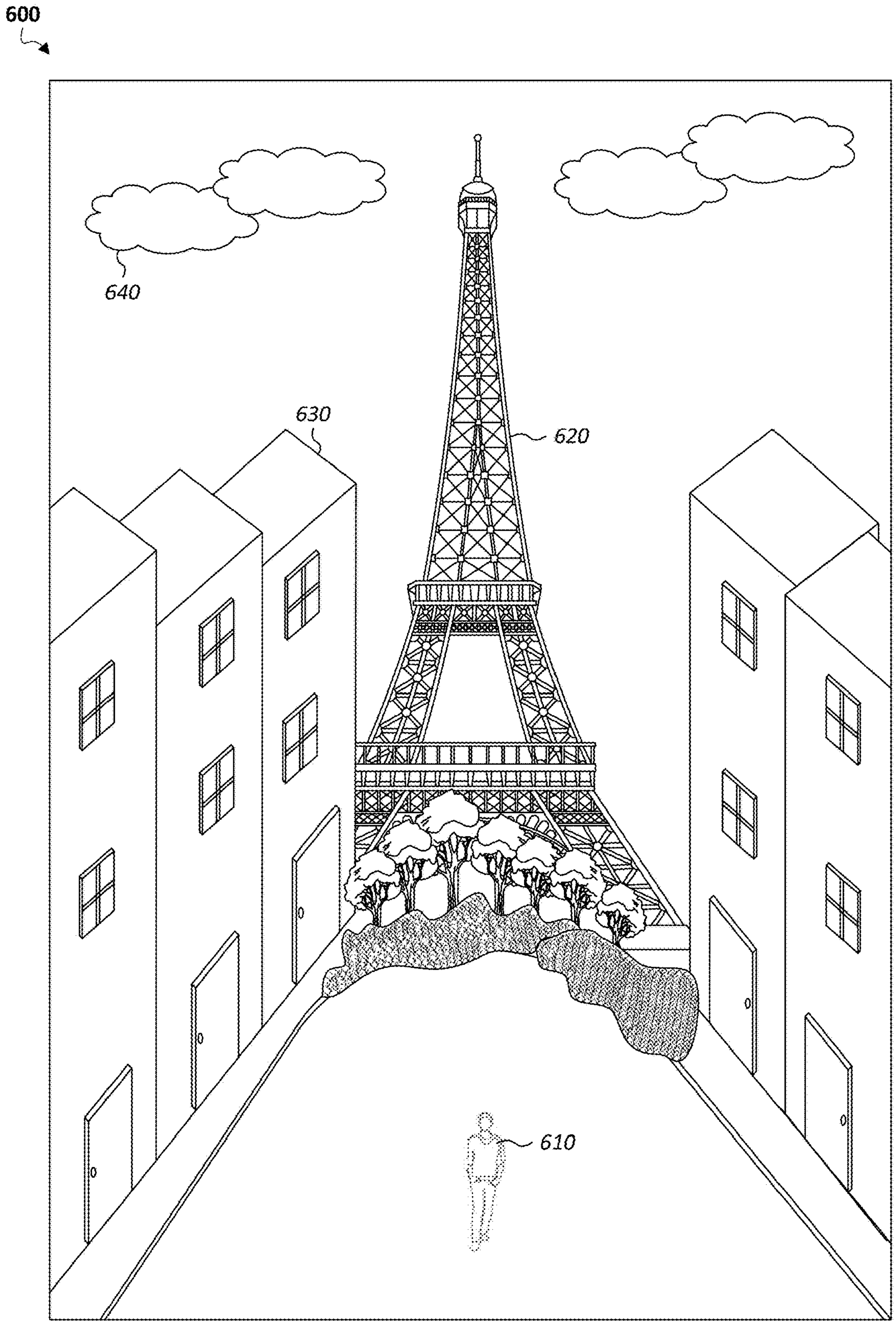
FIG. 6 illustrates another example of a scene of a metaverse, in accordance with some example implementations of the current subject matter.

Turning now to FIG. 6, a diagram illustrating another example of a scene 600 of a metaverse is shown. Scene 600 is an example of a scene that may be generated in a metaverse which is presenting the user with a city tour of Paris, France. In an example, when the metaverse environment reader analyzes and segments scene 600, the metaverse environment reader may detect and identify various objects in scene 600. These objects include the Eiffel Tower 620, a building 630, and a cloud 640. While only one building 630 is shown as being labeled, in other examples, any number of the other buildings may also be labeled. Also, any number of other objects in scene 600 may also be labeled, depending on the configuration settings of the metaverse environment reader. The user 610 (i.e., avatar 610) may be navigating within scene 600, and the navigation assistance module may be providing updates to the user 610 as the orientation and proximity of the user with respect to the objects in scene 600 changes.

In an example, the metaverse environment reader may utilize a deep learning engine that has been trained with a large number (e.g., hundreds, thousands) of images of different famous landmarks from around the world. This trained deep learning engine may identify the environment of scene 600 as Paris, France based on a recognition of the Eiffel Tower. Then, another deep learning engine may be utilized, with this other deep learning engine trained specifically using a relatively large number of images of Paris, France. Other deep learning engines may also be utilized for specific neighborhoods within Paris. Also, the time of year (e.g., winter, spring, summer, autumn) of scene 600 may be determined using a specifically trained deep learning engine, and then another deep learning engine trained for the particular time of year may be utilized for another round of analysis of scene 600. This approach may fine-tune the analysis of scene 600 based on whether there is snow on the ground, leaves on the trees, and so on.

Additionally, fine-tuning based on the type of weather may be utilized by the metaverse environment reader, with an identification of the time of day (e.g., daytime, nightime), type of weather (e.g., rain, overcast, sunny), and other factors being identified by a first deep learning engine and then subsequent analysis being performed by a second deep learning engine, with the second deep learning engine selected based on the results generated by the first deep learning engine. Additional deep learning engines may be utilized, with the results of the second deep learning engine being utilized to select a third deep learning engine, results from the third deep learning engine being utilized to select a fourth deep learning engine, and so on.

When analyzing and segmenting scene 600, the metaverse environment reader may determine the order of importance of the objects in scene 600. For example, the metaverse environment reader may utilize a specially trained deep learning engine to determine the most prominent object in scene 600 and then the other less prominent objects in their order of importance in scene 600. In scene 600, deep learning engine may determine that Eiffel Tower 620 is the most prominent object in scene 600 based on its size, based on an environmental context, and based on one or more other factors. When a description of scene 600 is generated to be presented to the visually impaired user or to the visually impaired and hearing impaired user, the metaverse environment reader may begin with a description of the Eiffel Tower 620 since the deep learning engine has determined that Eiffel Tower 620 is the most prominent object in scene 600. The description generated and presented to the user may be based on the order of importance determined by the trained deep learning engine.

Figure 7:
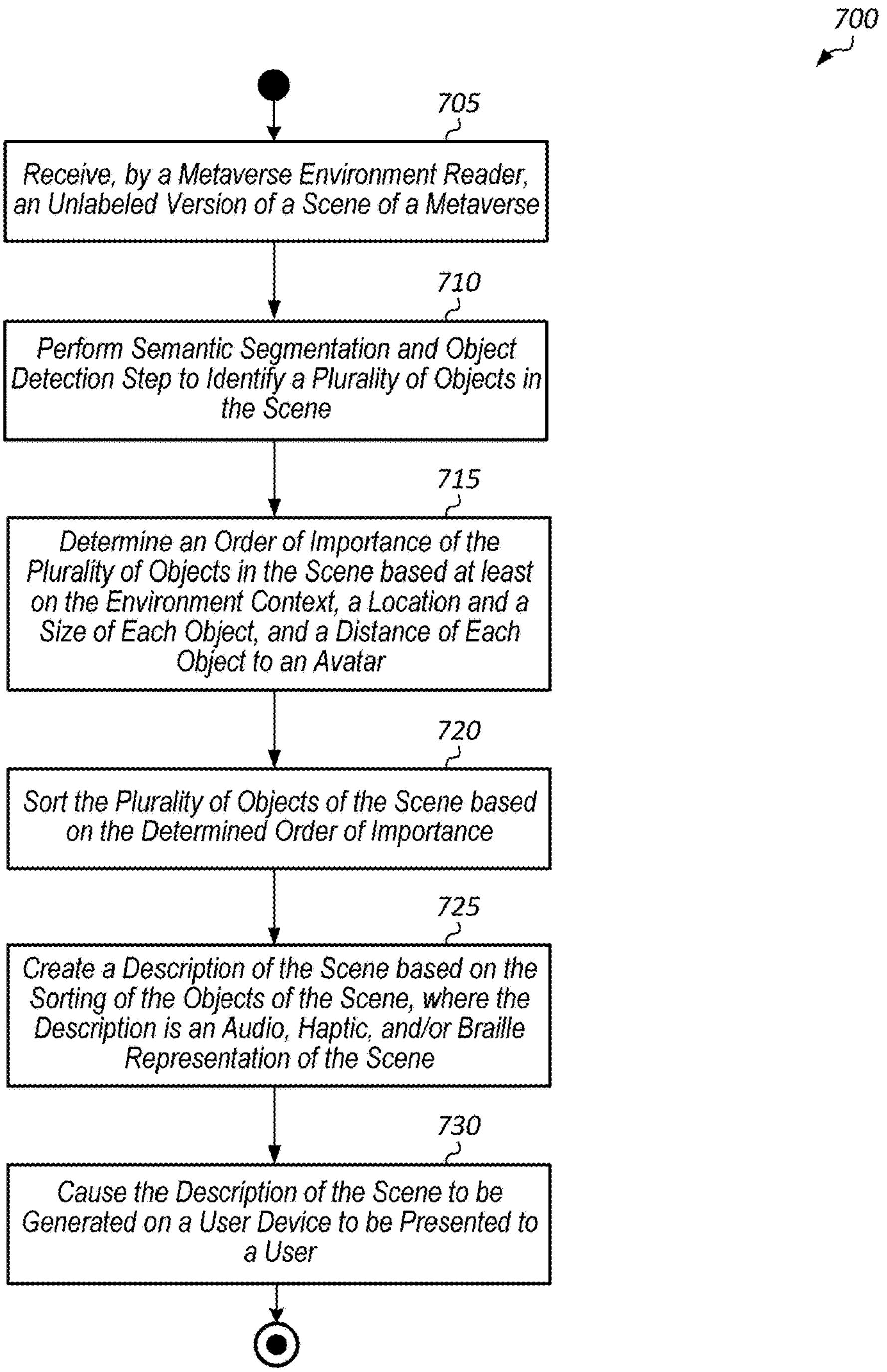
FIG. 7 illustrates a flow diagram of a process for implementing a metaverse environment reader.

Referring now to FIG. 7, a flow diagram illustrating a process 700 for implementing a metaverse environment reader is shown. At the beginning of process 700 (i.e., method 700), a metaverse environment reader receives an unlabeled version of a scene of a metaverse (block 705). Then, the metaverse environment reader performs semantic segmentation and object detection steps to identify a plurality of objects in the scene (block 710). In an example, the metaverse environment reader uses a deep learning engine to segment the unlabeled version of the scene to identify a plurality of objects in the scene.

Next, the metaverse environment reader determines an order of importance of the plurality of objects in the scene based at least on the environment context, a location and a size of each object, and a distance of each object to an avatar (block 715). In an example, the metaverse environment reader uses a deep learning engine to determine the environment context and to determine an order of importance of the plurality of objects in the scene. Then, the metaverse environment reader sorts the plurality of objects of the scene based on the determined order of importance (block 720). The sorted order of objects in the scene corresponds to the order of importance. As used herein, the term "indexing" may be defined as determining an order of importance of the plurality of objects in a scene and sorting the plurality of objects based on the determined order of importance. Accordingly, performing blocks 715 and 720 may be referred to as indexing the plurality of objects in the scene.

In an example, there could be different deep learning algorithms that determine the order based on different parameters. For example, a first deep learning engine may employ an algorithm that is based on the size of objects, a second deep learning engine may be based on the location of objects, a third deep learning engine may be based on the environment context, and so on. Next, the metaverse environment reader creates a description of the scene based on the sorting of the objects of the scene, where the description is an audio, haptic, and/or braille representation of the scene (block 725). The description of the scene may include a listing of objects in a given order based on the order of importance determined from the sorting of the objects of the scene. Then, the metaverse environment reader causes the description of the scene to be generated on a user device to be presented to a user (block 730). After block 730, method 700 may end. It is noted that method 700 may be repeated for each separate scene (e.g., first scene, second scene, third scene) of the metaverse.

Figure 8:
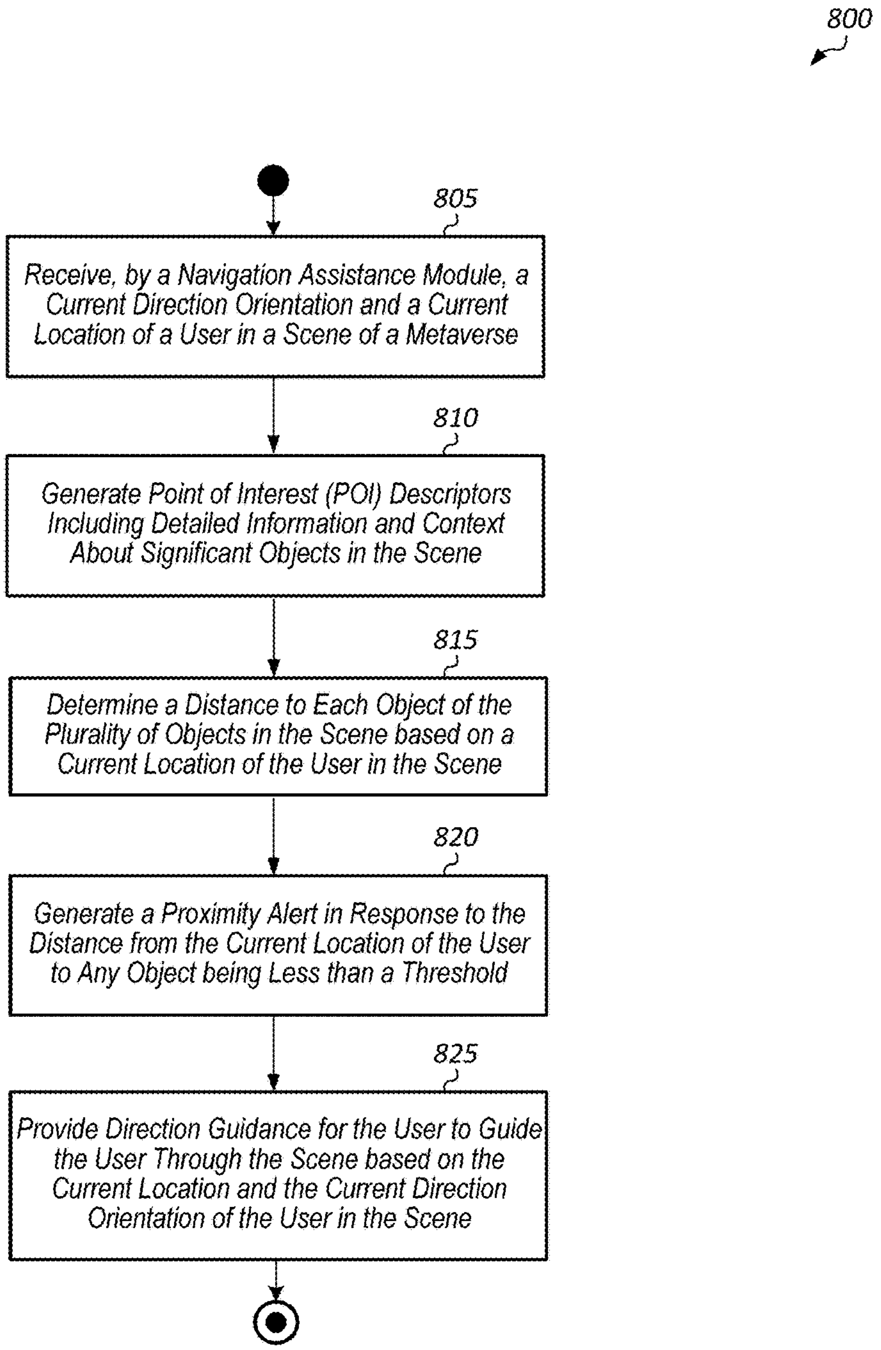
FIG. 8 illustrates a flow diagram of a process for implementing a navigation assistance module.

Turning now to FIG. 8, a flow diagram illustrating a process 800 for implementing a navigation assistance module is shown. At the beginning of process 800 (i.e., method 800), a navigation assistance module receives a current direction orientation and a current location of a user in a scene of a metaverse (block 805). Also, the navigation assistance module generates point of interest (POI) descriptors including detailed information and context about significant objects in the scene (block 810). In an example, the navigation assistance module uses a deep learning engine to generate the POI descriptors for the significant objects in the scene. Additionally, the navigation assistance module determines a distance to each object of a plurality of objects in the scene based on the current location of the user in the scene (block 815). Next, the navigation assistance module generates a proximity alert in response to the distance from the current location of the user to any object of the plurality of objects being less than a threshold (block 820). Also, the navigation assistance module provides direction guidance for the user to guide the user through the scene based on the current location and the current direction orientation of the user in the scene (block 825). After block 825, method 800 ends. It is noted that method 800 may be repeated for each separate scene of the metaverse.

Figure 9A:
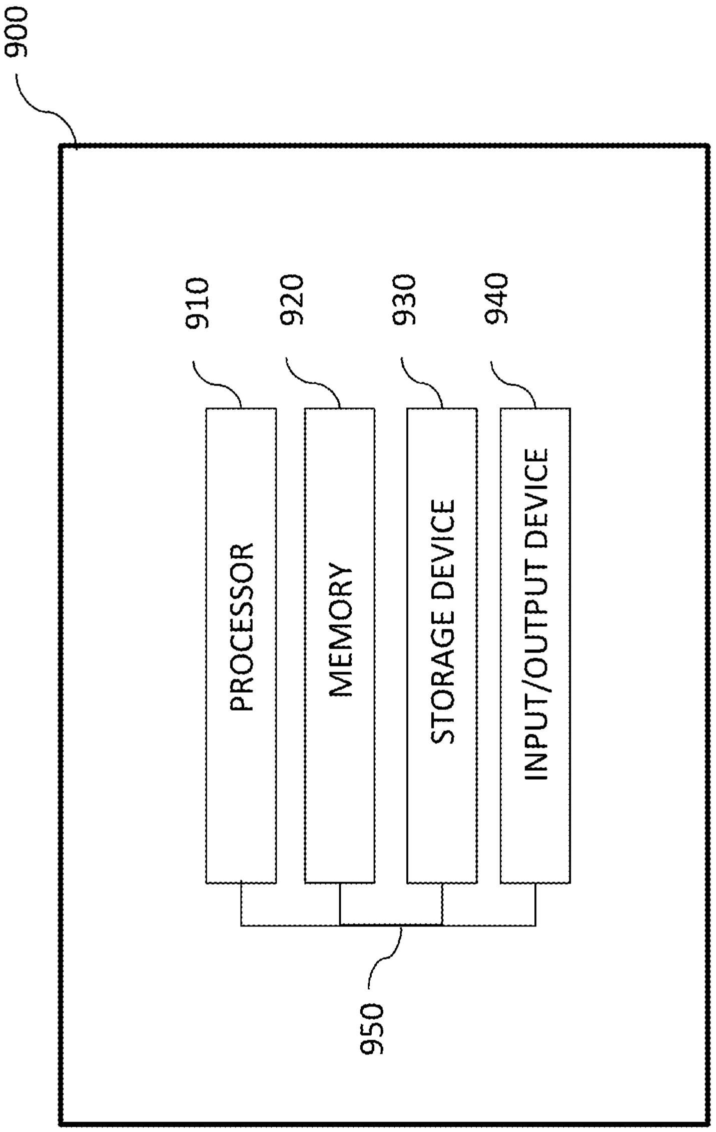
FIG. 9A depicts an example of a system, in accordance with some example implementations of the current subject matter.

In some implementations, the current subject matter may be implemented in a system 900, as shown in FIG. 9A. The system 900 may include a processor 910, a memory 920, a storage device 930, and an input/output device 940. Each of the components 910, 920, 930 and 940 may be interconnected using a system bus 950. The processor 910 may be configured to process instructions for execution within the system 900. In some implementations, the processor 910 may be a single-threaded processor. In alternate implementations, the processor 910 may be a multi-threaded processor. The processor 910 may be further configured to process instructions stored in the memory 920 or on the storage device 930, including receiving or sending information through the input/output device 940. The memory 920 may store information within the system 900. In some implementations, the memory 920 may be a computer-readable medium. In alternate implementations, the memory 920 may be a volatile memory unit. In yet some implementations, the memory 920 may be a non-volatile memory unit. The storage device 930 may be capable of providing mass storage for the system 900. In some implementations, the storage device 930 may be a computer-readable medium. In alternate implementations, the storage device 930 may be a floppy disk device, a hard disk device, an optical disk device, a tape device, non-volatile solid state memory, or any other type of storage device. The input/output device 940 may be configured to provide input/output operations for the system 900. In some implementations, the input/output device 940 may include a keyboard and/or pointing device. In alternate implementations, the input/output device 940 may include a display unit for displaying graphical user interfaces.

Figure 9B:
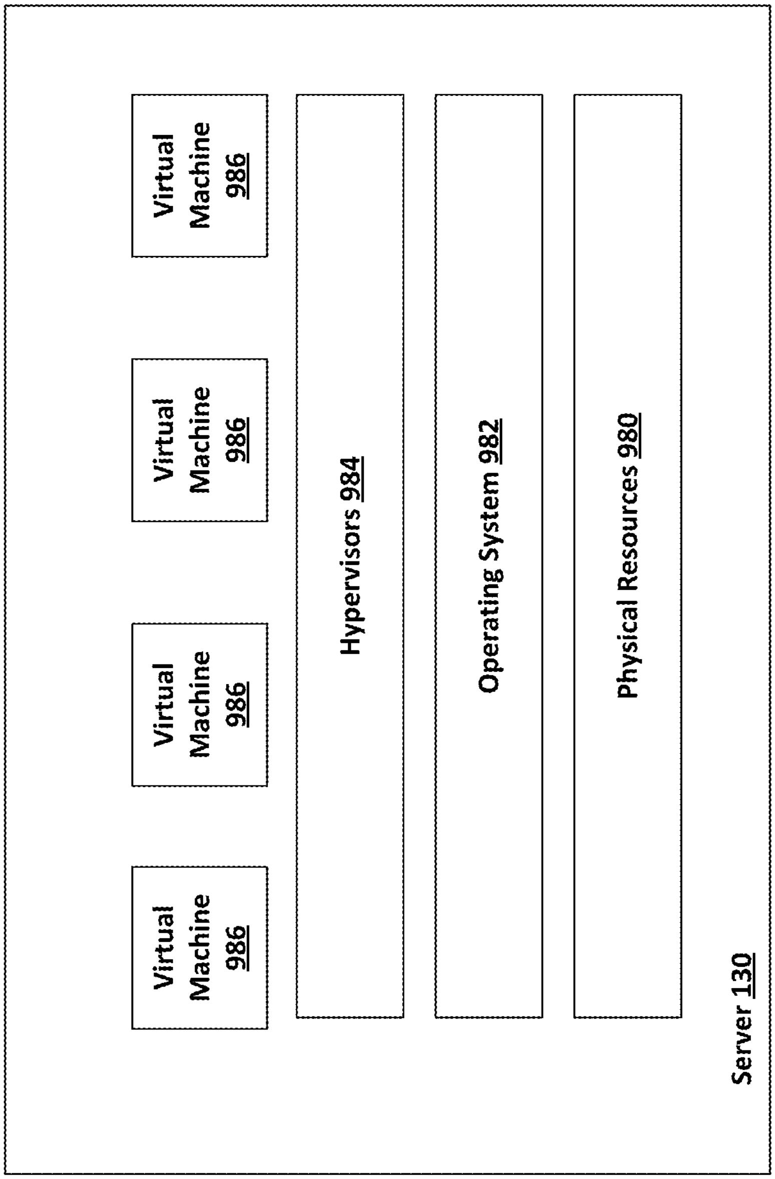
FIG. 9B depicts another example of a system, in accordance with some example implementations of the current subject matter.

FIG. 9B depicts an example implementation of the server 130, which provides the metaverse environment reader and navigation assistant 135A. The server 130 may include physical resources 980, such as at least one hardware servers, at least one storage device, at least one memory device, at least one network interface, and the like. The server may also include infrastructure, as noted above, which may include at least one operating systems 982 for the physical resources and at least one hypervisor 984 (which may create and run at least one virtual machine 986). For example, each multitenant application may be run on a corresponding virtual machine.

Figure 10:
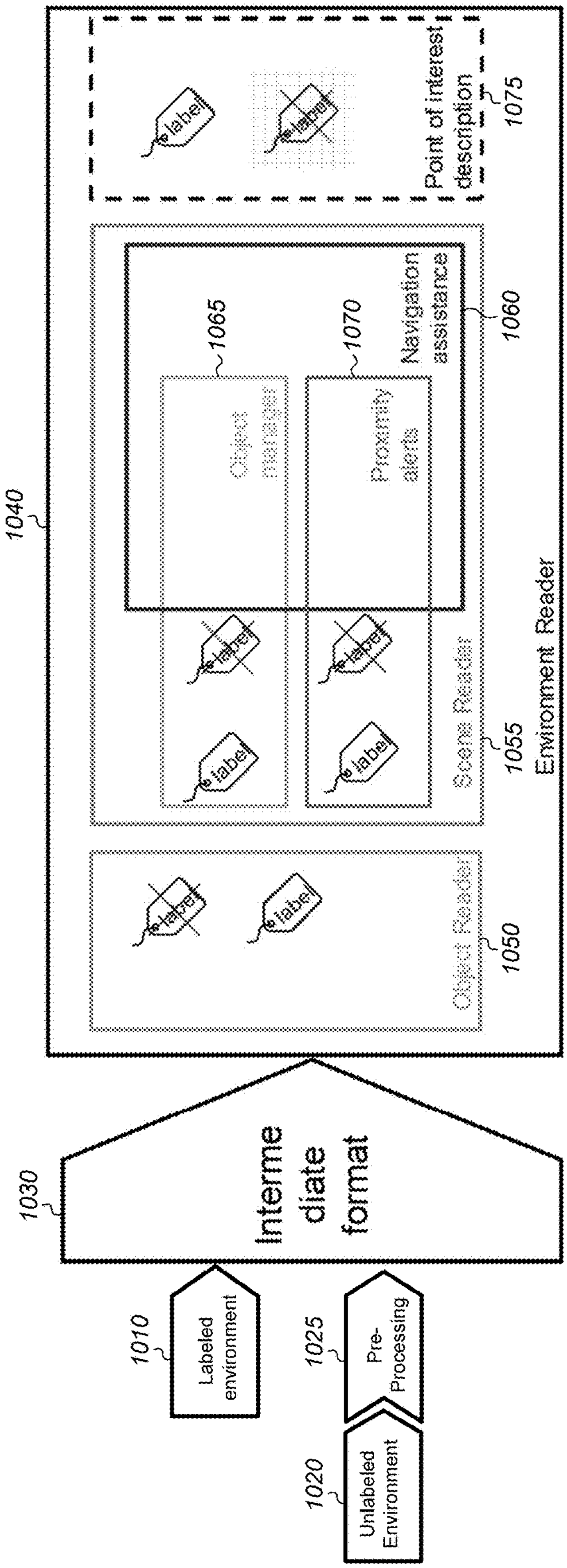
FIG. 10 illustrates a logical block diagram of the functionality for implementing one or more of the techniques associated with the current subject matter.

Turning now to FIG. 10, a logical block diagram illustrating the functionality for implementing one or more of the techniques associated with the current subject matter is shown. In an example, the metaverse is a labeled environment 1010, with the metaverse providing labels for the scene and objects in the scene via one or more APIs. In other examples, the metaverse is an unlabeled environment 1020, and a pre-processing step 1025 is performed to generate the labels for the scene and the objects in the scene. Pre-processing step 1025 may involve using deep learning techniques to derive the labels for the scene. The output from the metaverse is shown as intermediate format 1030 for the embodiments associated with the labeled environment 1010. Also, the output from pre-processing step 1025 is shown as intermediate format 1030 for the embodiments associated with the unlabeled environment 1020. In another example, the pre-processing step 1025 may be incorporated within environment reader 1040.

As shown in FIG. 10, the metaverse output represented by intermediate format 1030 is provided as an input to environment reader 1040. Environment reader 1040 includes functionality that may be partitioned into multiple components, with these components including object reader 1050, scene reader 1055, navigation assistance 1060, and object manager 1065. Navigation assistance module 1060 may generate proximity alerts 1070 based on the location and orientation of the avatar representing the user in relation to the locations of the objects, detected by object reader 1050 and managed by object manager 1065. Navigation assistance module 1060 also generates point of interest description 1075 based on the objects in the scene and the analysis performed by scene reader 1055. For example, as an avatar is moving through the metaverse, such as walking on the sidewalk of a city street, navigation assistance module 1060 may generate a description such as: "On the left-side of the street is a coffee shop, and next to the coffee shop is a bakery. On the right-side of the street is a bank, and next to the bank is a bookstore." These kinds of descriptions may continue to be generated by navigation assistance module 1060 as the avatar is advancing down the street, turns into an alley, walks through a park, and so on.

In an example, point of interest description 1075 is generated to describe metadata for objects in a scene, with the metadata not being based on the visual information of the scene or on the visual information of the objects. In this example, point of interest description 1075 is generated for scenes with pre-labeled objects. For example, the point of interest description may include information like "the castle was built in the year 1223 and was conquered in 1305 by the Spanish conqueror.". In other examples, the point of interest description may include information like "it is very cold in this scene" or "the drink smells like coffee". In an example, scene reader 1055 may identify a contextual setting of a scene, and scene reader 1055 may generate an abstract term for the scene based on the identified contextual setting. For example, scene reader 1055 may identify a scene as a playground, a theater, a train station, a forest, and so on. The identification of the scene with an abstract term is a way to make a visually impaired person understand the environment they are in. Listing the objects in the environment based on their importance corresponds to a detailed description of the scene. In an example, object reader 1050 identifies and describes individual objects of a scene. For example, object reader 1050 may identify and describe an individual object with a description such as "this is a wooden chair with armrests". The description may come from a pre-defined label, or the description may come from a generated label using visual information associated with the object.

It should be understood that the structure and arrangement of components of environment reader 1040 presented in FIG. 10 is merely representative of one particular example. In other examples, other suitable structures and arrangement of components of environment reader 1040 may be employed. In these other examples, one or more components not shown in FIG. 10 may be included as part of environment reader 1040 and/or one or more components shown in FIG. 10 may be omitted. It is also noted the environment reader 1040 may also be referred to as metaverse environment reader 1040.

Figure 11:
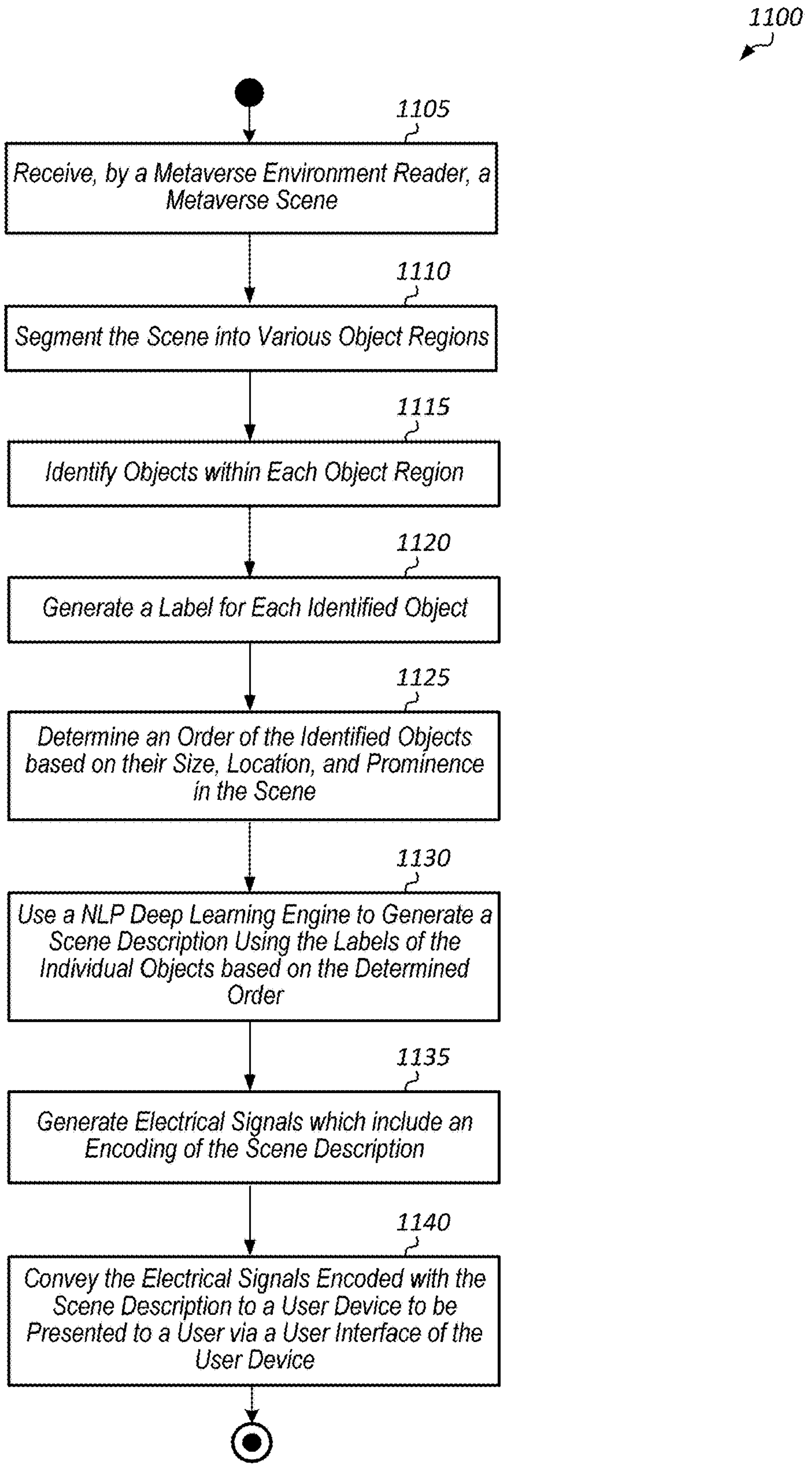
FIG. 11 illustrates a flow diagram of a process for implementing a metaverse environment reader.

Referring now to FIG. 11, a flow diagram illustrating a process 1100 for implementing a metaverse environment reader is shown. At the beginning of process 1100 (i.e., method 1100), a metaverse environment reader (e.g., metaverse environment reader 310 of FIG. 3, environment reader 1040 of FIG. 10) receives a metaverse scene from a metaverse platform (e.g., metaverse platform 320 of FIG. 3) (block 1105). Next, the metaverse environment reader segments the scene into various object regions (block 1110). In an example, the various object regions may include regions of similar type objects such as buildings, trees, vehicles, and so on. Then, the metaverse environment reader identifies objects within each object region (block 1115). In an example, the metaverse environment reader uses a deep learning engine to identify objects within each object region. The deep learning engine may use any of various algorithms such as Faster R-CNN, YOLO, SSD, or other suitable algorithms. Next, the metaverse environment reader generates a label for each identified object (block 1120). In an example, the metaverse environment reader uses a NLP deep learning engine to generate labels for identified objects. The NLP deep learning engine may use any of various deep learning models such as RNNs, Transformer models, or GPT models.

Then, the metaverse environment reader determines an order of the identified objects based on their size, location, and prominence in the scene (block 1125). In an example, the metaverse environment reader uses a machine learning engine to determines the order of the identified objects. The machine learning engine may use any of various machine learning algorithms such as U-Net, FCN, and Mask R-CNN. Next, the metaverse environment reader uses a NLP deep learning engine to generate a scene description using the labels of the individual objects based on the determined order (block 1130).

Then, the metaverse environment reader generates one or more electrical signals which include an encoding of the scene description (block 1135). Next, the metaverse environment reader conveys the electrical signals encoded with the scene description to a user device to be presented to a user via a user interface of the user device (block 1140). The scene description may be an audio, haptic, and/or braille representation of the scene. After block 1140, method 1100 may end. It is noted that method 1100 may be repeated for each separate of the metaverse.

Figure 12:
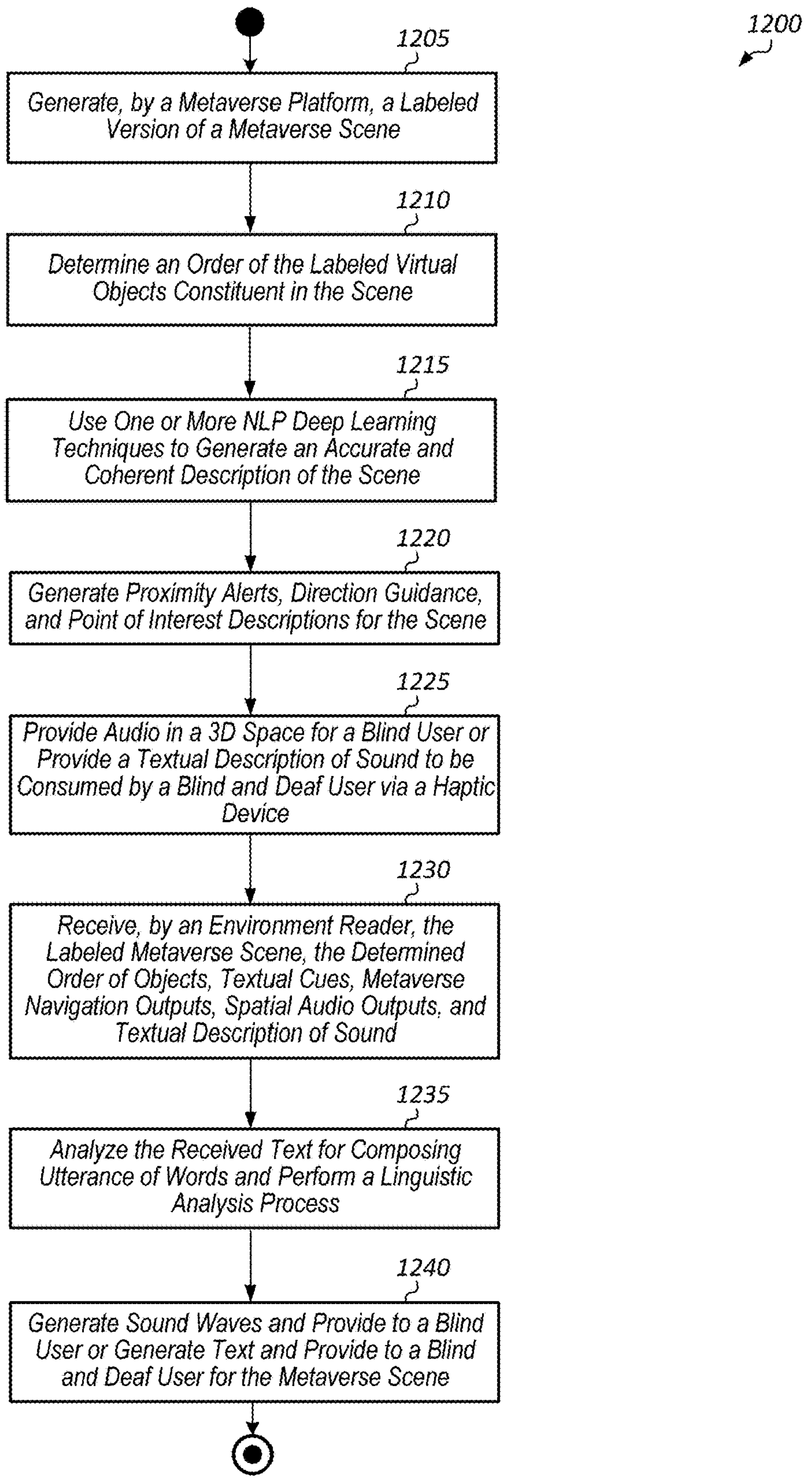
FIG. 12 illustrates a flow diagram of a process for implementing an enhanced metaverse environment for visually-impaired users and visually-and-hearing-impaired users.

Turning now to FIG. 12, a flow diagram illustrating a process 1200 for implementing an enhanced metaverse environment for visually-impaired users and visually-and-hearing-impaired users is shown. A labeled version of a metaverse scene is generated by a metaverse platform (e.g., metaverse platform 220 of FIG. 2) (block 1205). In an example, the labeled metaverse scene includes labeled virtual objects. Also, an object manager (e.g., object manager 230) of the metaverse platform determines an order of the labeled virtual objects constituent in the scene (block 1210). Additionally, the object manager uses one or more natural language processing (NLP) deep learning techniques to generate an accurate and coherent description of the scene (block 1215). Still further, a navigation assistance module (e.g., navigation assistance module 240) generates proximity alerts, direction guidance, and point of interest descriptions for the scene (block 1220). Also, a spatial sound module provides audio in a three-dimension space for a blind user or the spatial sound module provides a textual description of sound to be consumed by a deaf and blind user via a haptic device (block 1225).

Next, an environment reader (e.g., metaverse environment reader 210) receives the labeled metaverse scene, the determined order of objects, textual cues, metaverse navigation outputs, spatial audio outputs, and textual description of sound from the metaverse platform via a platform-dependent metaverse integration component (block 1230). A test analyzer module of the metaverse environment reader analyzes the received text for composing utterance of words and a linguistic analysis process is performed (block 1235). Then, sound waves are generated and provided to a blind user or text is generated and provided, via a haptic device, to a blind and deaf user for the metaverse scene (block 1240). After block 1240, method 1200 may end.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;"

"one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method, comprising: receiving, by a metaverse environment reader, a first scene of a metaverse; performing, by the metaverse environment reader, semantic segmentation and object detection steps to identify a plurality of objects in the first scene; indexing, by the metaverse environment reader, the plurality of objects of the first scene based on the semantic segmentation and object detection steps; creating, by the metaverse environment reader, a description of the first scene based on the indexing of the first scene, wherein the description is an audio, haptic, or braille representation of the first scene; generating, by the metaverse environment reader, one or more electrical signals which include an encoding of the description of the first scene; and conveying, by the metaverse environment reader, the one or more electrical signals encoded with the description of the first scene to a user device to be presented on a user interface.

Example 2: The method of Example 1, further comprising: determining, by the metaverse environment reader, an order of importance of the plurality of objects in the first scene based at least on a location and a size of each object of the plurality of objects; and sorting, by the metaverse environment reader, the plurality of objects of the first scene based on the determined order of importance.

Example 3: The method of any of Examples 1-2, further comprising: receiving, by a navigation assistance module, a current direction orientation and a current location of an avatar in the first scene of the metaverse; determining, by the navigation assistance module, a distance to each object of the plurality of objects in the first scene based on the current location of the avatar in the first scene; generating, by the navigation assistance module, a proximity alert in response to the distance from the current location of the avatar to each object of the plurality of objects being less than a threshold; and providing, by the navigation assistance module, direction guidance to the user device to be presented on the user interface to guide the avatar through the first scene based on the current location and the current direction orientation of the avatar in the first scene.

Example 4: The method of any of Examples 1-3, wherein the navigation assistance module is a sub-module of the metaverse environment reader.

Example 5: The method of any of Examples 1-4, wherein the first scene is unlabeled, and wherein the method further comprising generating a label for each object of the plurality of objects based on the segmenting of the first scene.

Example 6: The method of any of Examples 1-5, wherein the description of the first scene comprises: a listing of objects in a given order based on the determined order of importance; and the label for each object of the plurality of objects.

Example 7: The method of any of Examples 1-6, further comprising segmenting the first scene with a trained deep learning engine.

Example 8: The method of any of Examples 1-7, further comprising receiving an indication of a type of user accessing the first user device, wherein the indication can specify whether the type of user is visually-impaired or visually-impaired and hearing-impaired.

Example 9: The method of any of Examples 1-8, wherein segmenting the first scene comprises partitioning the first scene into a plurality of object regions.

Example 10: The method of any of Examples 1-9, wherein determining an order of objects in the first scene is performed by a trained deep learning engine and further based on a prominence of each object of the plurality of objects in the first scene.

Example 11: A system, comprising: at least one processor; and at least one memory including program instructions which when executed by the at least one processor causes operations comprising: receiving, by a metaverse environment reader, a first scene of a metaverse; performing, by the metaverse environment reader, semantic segmentation and object detection steps to identify a plurality of objects in the first scene; indexing, by the metaverse environment reader, the plurality of objects of the first scene based on the semantic segmentation and object detection steps; creating, by the metaverse environment reader, a description of the first scene based on the indexing of the first scene, wherein the description is an audio, haptic, or braille representation of the first scene; generating, by the metaverse environment reader, one or more electrical signals which include an encoding of the description of the first scene; and conveying, by the metaverse environment reader, the one or more electrical signals encoded with the description of the first scene to a user device to be presented on a user interface.

Example 12: The system of Example 11, wherein the program instructions are further executable by the at least one processor to cause operations comprising: determining, by the metaverse environment reader, an order of importance of the plurality of objects in the first scene based at least on a location and a size of each object of the plurality of objects; and sorting, by the metaverse environment reader, the plurality of objects of the first scene based on the determined order of importance.

Example 13: The system of any of Examples 11-12, wherein the program instructions are further executable by the at least one processor to cause operations comprising: receiving, by a navigation assistance module, a current direction orientation and a current location of an avatar in the first scene of the metaverse; determining, by the navigation assistance module, a distance to each object of the plurality of objects in the first scene based on the current location of the avatar in the first scene; generating, by the navigation assistance module, a proximity alert in response to the distance from the current location of the avatar to each object of the plurality of objects being less than a threshold; and providing, by the navigation assistance module, direction guidance to the user device to be presented on the user interface to guide the avatar through the first scene based on the current location and the current direction orientation of the avatar in the first scene.

Example 14: The system of any of Examples 11-13, wherein the navigation assistance module is a sub-module of the metaverse environment reader.

Example 15: The system of any of Examples 11-14, wherein the first scene is unlabeled, and wherein the program instructions are further executable by the at least one processor to cause operations comprising generating a label for each object of the plurality of objects based on the segmenting of the first scene.

Example 16: The system of any of Examples 11-15, wherein the description of the first scene comprises: a listing of objects in a given order based on the determined order of importance; and the label for each object of the plurality of objects.

Example 17: The system of any of Examples 11-16, wherein the program instructions are further executable by the at least one processor to cause operations comprising segmenting the first scene with a trained deep learning engine.

Example 18: The system of any of Examples 11-17, wherein the program instructions are further executable by the at least one processor to cause operations comprising receiving an indication of a type of user accessing the first user device, wherein the indication can specify whether the type of user is visually-impaired or visually-impaired and hearing-impaired.

Example 19: The system of any of Examples 11-18, wherein segmenting the first scene comprises partitioning the first scene into a plurality of object regions.

Example 20: A non-transitory computer readable medium storing instructions, which when executed by at least one data processor, cause operations comprising: receiving, by a metaverse environment reader, a first scene of a metaverse; performing, by the metaverse environment reader, semantic segmentation and object detection steps to identify a plurality of objects in the first scene; indexing, by the metaverse environment reader, the plurality of objects of the first scene based on the semantic segmentation and object detection steps; creating, by the metaverse environment reader, a description of the first scene based on the indexing of the first scene, wherein the description is an audio, haptic, or braille representation of the first scene; generating, by the metaverse environment reader, one or more electrical signals which include an encoding of the description of the first scene; and conveying, by the metaverse environment reader, the one or more electrical signals encoded with the description of the first scene to a user device to be presented on a user interface.

Example 21: The method of any of Examples 1-9, further comprising: receiving, by the metaverse environment reader, a second scene of the metaverse, wherein objects in the second scene are labeled; creating, by the metaverse environment reader, a second description of the second scene based on one or more labels of one or more objects in the second scene; generating, by the metaverse environment reader, one or more second electrical signals which include an encoding of the second description of the second scene; and conveying, by the metaverse environment reader, the one or more second electrical signals encoded with the second description of the first scene to the user device to be presented on the user interface.

Example 22: The method of Example 21, further comprising generating a point of interest description describing metadata for the one or more objects in the second scene, wherein the metadata is not based on visual information of the second scene or of the one or more objects in the second scene.

Example 23: The method of any of Examples 1-9 or 21-22, further comprising: identifying, by an object reader, the plurality of objects in the first scene; generating, by the object reader, descriptions of the plurality of objects in the first scene based on visual information associated with the plurality of objects; and generating, by the object reader, descriptions of the one or more objects in the second scene from the one or more labels.

Example 24: The method of any of Examples 1-9 or 21-23, further comprising: identifying, by a scene reader, a contextual setting of the first scene; and generating, by the scene reader, an abstract term for the first scene based on the identified contextual setting.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method, comprising:

receiving, by a metaverse environment reader, a first scene of a metaverse;

performing, by the metaverse environment reader, semantic segmentation and object detection steps to identify a plurality of objects in the first scene;

indexing, by the metaverse environment reader, the plurality of objects of the first scene based on the semantic segmentation and object detection steps;

creating, by the metaverse environment reader, a description of the first scene based on the indexing of the first scene, wherein the description is an audio, haptic, or braille representation of the first scene;

generating, by the metaverse environment reader, one or more electrical signals which include an encoding of the description of the first scene; and conveying, by the metaverse environment reader, the one or more electrical signals encoded with the description of the first scene to a user device to be presented on a user interface, wherein indexing the plurality of objects of the first scene comprises:

determining, by the metaverse environment reader, an order of importance of the plurality of objects in the first scene based at least on a location and a size of each object of the plurality of objects; and sorting, by the metaverse environment reader, the plurality of objects of the first scene based on the determined order of importance.

2. The method of claim 1, further comprising:

receiving, by a navigation assistance module, a current direction orientation and a current location of an avatar in the first scene of the metaverse;

determining, by the navigation assistance module, a distance to each object of the plurality of objects in the first scene based on the current location of the avatar in the first scene;

generating, by the navigation assistance module, a proximity alert in response to the distance from the current location of the avatar to each object of the plurality of objects being less than a threshold; and providing, by the navigation assistance module, direction guidance to the user device to be presented on the user interface to guide the avatar through the first scene based on the current location and the current direction orientation of the avatar in the first scene.

3. The method of claim 1, further comprising:

receiving, by the metaverse environment reader, a second scene of the metaverse, wherein objects in the second scene are labeled;

creating, by the metaverse environment reader, a second description of the second scene based on one or more labels of one or more objects in the second scene;

generating, by the metaverse environment reader, one or more second electrical signals which include an encoding of the second description of the second scene; and conveying, by the metaverse environment reader, the one or more second electrical signals encoded with the second description of the first scene to the user device to be presented on the user interface.

4. The method of claim 3, further comprising generating a point of interest description describing metadata for the one or more objects in the second scene, wherein the metadata is not based on visual information of the second scene or of the one or more objects in the second scene.

5. The method of claim 3, further comprising:

identifying, by an object reader, the plurality of objects in the first scene;

generating, by the object reader, descriptions of the plurality of objects in the first scene based on visual information associated with the plurality of objects; and generating, by the object reader, descriptions of the one or more objects in the second scene from the one or more labels.

6. The method of claim 1, further comprising:

identifying, by a scene reader, a contextual setting of the first scene; and generating, by the scene reader, an abstract term for the first scene based on the identified contextual setting.

7. The method of claim 1, wherein objects in the first scene are unlabeled, and wherein the method further comprising generating a label for each object of the plurality of objects based on the segmenting of the first scene.

8. The method of claim 7, wherein the description of the first scene comprises:

a listing of objects in a given order based on the determined order of importance; and the label for each object of the plurality of objects.

9. The method of claim 1, wherein segmenting the first scene comprises partitioning the first scene into a plurality of object regions.

10. A system, comprising:

at least one processor; and at least one memory including program instructions which when executed by the at least one processor causes operations comprising:

receiving, by a metaverse environment reader, a first scene of a metaverse;

performing, by the metaverse environment reader, semantic segmentation and object detection steps to identify a plurality of objects in the first scene;

indexing, by the metaverse environment reader, the plurality of objects of the first scene based on the semantic segmentation and object detection steps;

creating, by the metaverse environment reader, a description of the first scene based on the indexing of the first scene, wherein the description is an audio, haptic, or braille representation of the first scene;

generating, by the metaverse environment reader, one or more electrical signals which include an encoding of the description of the first scene; and conveying, by the metaverse environment reader, the one or more electrical signals encoded with the description of the first scene to a user device to be presented on a user interface, wherein indexing the plurality of objects of the first scene comprises:

determining, by the metaverse environment reader, an order of importance of the plurality of objects in the first scene based at least on a location and a size of each object of the plurality of objects; and sorting, by the metaverse environment reader, the plurality of objects of the first scene based on the determined order of importance.

11. The system of claim 10, wherein the program instructions are further executable by the at least one processor to cause operations comprising:

receiving, by a navigation assistance module, a current direction orientation and a current location of an avatar in the first scene of the metaverse;

determining, by the navigation assistance module, a distance to each object of the plurality of objects in the first scene based on the current location of the avatar in the first scene;

generating, by the navigation assistance module, a proximity alert in response to the distance from the current location of the avatar to each object of the plurality of objects being less than a threshold; and providing, by the navigation assistance module, direction guidance to the user device to be presented on the user interface to guide the avatar through the first scene based on the current location and the current direction orientation of the avatar in the first scene.

12. The system of claim 10, wherein the program instructions are further executable by the at least one processor to cause operations comprising:

receiving, by the metaverse environment reader, a second scene of the metaverse, wherein objects in the second scene are labeled;

creating, by the metaverse environment reader, a second description of the second scene based on one or more labels of one or more objects in the second scene;

generating, by the metaverse environment reader, one or more second electrical signals which include an encoding of the second description of the second scene; and conveying, by the metaverse environment reader, the one or more second electrical signals encoded with the second description of the first scene to the user device to be presented on the user interface.

13. The system of claim 12, wherein the program instructions are further executable by the at least one processor to cause operations comprising generating a point of interest description describing metadata for the one or more objects in the second scene, wherein the metadata is not based on visual information of the second scene or of the one or more objects in the second scene.

14. The system of claim 12, wherein the program instructions are further executable by the at least one processor to cause operations comprising:

identifying, by an object reader, the plurality of objects in the first scene;

generating, by the object reader, descriptions of the plurality of objects in the first scene based on visual information associated with the plurality of objects; and generating, by the object reader, descriptions of the one or more objects in the second scene from the one or more labels.

15. The system of claim 10, wherein objects in the first scene are unlabeled, and wherein the program instructions are further executable by the at least one processor to cause operations comprising generating a label for each object of the plurality of objects based on the segmenting of the first scene.

16. The system of claim 10, wherein the description of the first scene comprises:

a listing of objects in a given order based on the determined order of importance; and the label for each object of the plurality of objects.

17. The system of claim 10, wherein segmenting the first scene comprises partitioning the first scene into a plurality of object regions.

18. A non-transitory computer readable medium storing instructions, which when executed by at least one data processor, cause operations comprising:

receiving, by a metaverse environment reader, a first scene of a metaverse;

performing, by the metaverse environment reader, semantic segmentation and object detection steps to identify a plurality of objects in the first scene;

indexing, by the metaverse environment reader, the plurality of objects of the first scene based on the semantic segmentation and object detection steps;

creating, by the metaverse environment reader, a description of the first scene based on the indexing of the first scene, wherein the description is an audio, haptic, or braille representation of the first scene;

generating, by the metaverse environment reader, one or more electrical signals which include an encoding of the description of the first scene; and conveying, by the metaverse environment reader, the one or more electrical signals encoded with the description of the first scene to a user device to be presented on a user interface, wherein indexing the plurality of objects of the first scene comprises:

determining, by the metaverse environment reader, an order of importance of the plurality of objects in the first scene based at least on a location and a size of each object of the plurality of objects; and sorting, by the metaverse environment reader, the plurality of objects of the first scene based on the determined order of importance.

* * * * *